United States Patent [19]

Radebold

[11] 4,002,158
[45] Jan. 11, 1977

[54] SUPPORT STRUCTURE FOR SOLAR ENERGY CONVERTER

[76] Inventor: Reinhart Radebold, Quastenhornweg 14a, 1 Berlin 22, Germany

[22] Filed: Jan. 29, 1975

[21] Appl. No.: 545,134

[30] Foreign Application Priority Data

Jan. 30, 1974  Germany .......................... 2405134

[52] U.S. Cl. .................................. 126/270; 60/641
[51] Int. Cl.² ............................................ F24J 3/02
[58] Field of Search ................. 126/270, 271; 52/2, 52/83; 60/641

[56] References Cited

UNITED STATES PATENTS

3,220,671  11/1965  Ashman et al. .................... 126/270
3,489,072  1/1970  Secor ..................................... 98/58
3,807,384  4/1974  Schach et al. ................. 126/270 R Primary Examiner—John J. Camby
Assistant Examiner—Henry C. Yuen
Attorney, Agent, or Firm—Ralf H. Siegemund

[57] ABSTRACT

A plurality of solar energy conversion units, each with a reflecting mirror, are disposed on top of a stem or reed-like tower composed of a bundle of major supply tubes each terminating in a conversion unit plus mirror combination with additional tubes provided in the stem for up and down transport of gases and liquids. Particularly buoyant mirror constructions and anchoring facilities for the bundle are described.

12 Claims, 12 Drawing Figures

SUPPORT STRUCTURE FOR SOLAR ENERGY CONVERTER

BACKGROUND OF THE INVENTION

The present invention relates to the positioning of a hydrazine generator or the like, using solar energy as primary source for energy, in an elevated position. More particularly, the invention relates to the positioning of a hydrazine generator constructed in accordance with my copending application Ser. No. 545,133, filed Jan. 29, 1975.

The copending application discloses and claims a hydrazine generator operating on the principle of magneto-hydrodynamic conversion to synthetize hydrazine out of hydrogen and nitrogen under utilization of solar energy. A high degree of efficiency, particularly on a long term basis, requires that solar energy be utilized to the utmost extent possible. Placing the solar energy converter or transformer close to or directly on the ground is practical only where the average of the duration of sunshine is quite high. Obviously, one will obtain best results in the desert region of median latitudes or on high mountains. On the other hand, the energy converter or transformer works more efficiently if the temperature differential between heating and the temperature of isothermic compression of the gaseous, auxiliary medium in the conversion and transformation system as described is as high as possible. Obviously, one will not operated at optimum conditions in the desert, but will be restricted to high desert mountains.

FEATURES OF THE INVENTION

It is an object of the present invention to provide for a structure to position an energy converter as described in the said copending application, in an elevated position.

The energy converter and transformer is of modular, elongaged, tubular construction and is placed within the cavity defined by a parabolic mirror focusing solar radiation onto that portion of the converter provided to receive radiant energy, for heating the absorbing parts to about 800° Kelvin. The mirror is constructed from gas filled chambers, cushion and backing to obtain some buoyancy. The other end of the converter is cooled by air, outside of the focusing effect of the mirror. This arrangement is placed on a stalk, stem, tower or "reed" extending sufficiently above the earth's surface and one will obtain both, a high temperature differential and little or no interruption of sunshine in the day-time.

The supporting "reed" is a tower made of tubes and stabilizing structures made of foam and of elastic resilient tubes, running either parallel to the reed's central axis or in helical configuration or both. These tubes serve as conduits for gas in up and liquid in down direction, in the stem to feed the raw materials needed by the solar converter aloft and discharging therefrom the product obtained and transported through the stem to ground. Specifically, hydrogen and nitrogen flow up, hydrazine flows down. The reed, thus, is basically hollow, but partitions may laterally divide the space for reasons of sealing. Ducts in the reed run air up to the top, whereby waste energy (or anergy) of the converter can be used to sustain a convective air current in up direction.

Solar exergy as absorbed in an altitude possibly free of climate influences is best absorbed above the troposphere, which can be found in this zone at about 11 km in height. Clusters of mirrors, which can be stabilized in regard to height by their own buoyance forces, are, however, objected to large wind forces; a stationary operation of transformers, and, at least the tethering of mirrors seams to be impossible. At 20 km in height, the situation is actually different in this zone; both climate and wind influences are minimal (zero layer).

The exergy transformer as such is designed for operation even in this altitude (in the most unfavorable case). The radiation is focused at MHD-modules entrance; the strong interactions within the MHD-process, especially the electro-magnetic interaction used for exergy extraction, permits operation of the module in high altitudes for a longer operation period due to the fact that the module is hermetically sealed in regard to its ambience and has no moving parts. The light weight construction of the MHD-converter and its accessories reduces the requirement for large buoyancing bodies, since exergy is extracted from the radiation received and presented by the device in form of electrical energy at high voltage and high frequency, and since a large portion of this exergy is stored immediately within the module by synthesis, the exergy transformer in accordance to this invention can be operated in a manner that is superior to all other exergy transforming systems (such as turbo-systems, thermionic converters, solar cells), particularly in regard to reliability and the transmission of the exergy (to ground).

The problem of anchoring an exergy transformer is similar for any system to be operated in significant heights. The support of the exergy transformer (designed in analogy to botanical organisms) is provided to have, in addition, several different functions, such as the transport of cooling air, the separation of $H_2O$ from the cooling air, transporting $H_2$ from ground as well as the transport of hydrazine synthesized and electrical energy for the $H_2O$-electrolysis and for general power supply to ground. These functions together will be executed by the reed-like support or connection as stated above. This support must be elastic and resilient to compensate the alternating wind forces, and, in addition, it must withstand tensile as well as compressive stress. The reed-like tower must be produced in a way a plant stem is growing from ground, lifted by the buoyancy-generating mirror system. The material used for construction should be light by weight but have an extreme tearing length; finally the reed-like stem should have transportation channels for the personnel as well as for parts, such as MHD-modules and mirrors for replacement.

A brief estimate demonstrates the problems connected with both the supply of solar exergy as well as removal of waste heat of the MHD-process. The design of the floating mirrors for the exergy transformer is based on technical data of former air ships (Zeppeline, such as Z 129) filled with $H_2$. Typical data in regard to the volume are in the order of $2 \cdot 10^5$ m$^3$ at a length of 250 m; the buoyance force is about 260 tons. The mirrors for the exergy transformer are symmetric by rotation; they will be stabilized and lifted not by linear but toroidal cushions. The surface to be utilized of a mirror with 200 m in diameter is $\pi \cdot 10^4$ m$^2$; a solar exergy flux of about 37.5 MW can be reflected (assuming a mirror efficiency of 0.86). A suspending, toroidal cushion for this mirror and having a volume of $10^5$ m$^3$ will have a radius (of the toroid) of about 15 m and will generate a buoyancy force of 10 tons approximately at a height of 20 km (using H$_2$). It can be seen from these numbers that only foils are to be used for the construction of the mirror, which are tensile-stressed by pressure differences. The MHD-modules located in the focus of the reflector particularly as to their entrance absorption heat exchanger require that light weight construction be used extensively due to the modest buoyancy of the mirror.

The air supply for heat removal should not depend on the accidental flow of air in the altitudes mentioned; the coolant has, therefore, to be supplied from ground; moreover there is no other basis to provide an adequate amount of H$_2$O-supply to exergy transformer than by cooling the air and using the resulting moisture precipitation. An MHD-process with a total efficiency of 0.3 has an output of electrical energy per unit consisting of a single mirror and several MHD-modules, of 11.0 MW; the waste heat to be removed is 26.5 MW.

The transport of the cooling air requires work; a specific exergy of nearly 10 Ws/g is used to lift a fluid 1 km in height against gravity. Air has a specific heat of about 1 Ws/g. Dry air enclosed within a tube leading from ground to an altitude of 20 km will have a temperature difference between ground and this altitude of about 200 K is in thermodrynamic equilibrium. That equilibrium requires adiabatic insulation of the tube. Such an isentropic temperature distribution can be observed, indeed, up to an altitude of about 11 km, if there are no disturbances, caused by inversions and by condensation of H$_2$O vapor. (The local non-equilibria create the driving forces for the weather).

At elevations higher than 11 km the conditions outside of the tube are changed basically; the temperature is no longer determined by convection of heat that resulted from absorption of solar radiation at the ground, but absorption within the atmosphere becomes the dominating factor. The temperature distribution is constant, and the layers of air are isenthalpic up to an altitude of 30 km. The adiabatic insulation of the tube will not change the isentropic temperature distribution within; the air within the tube is cooler than the ambient air and the differential increases with altitude.

To transport the cooling air to the MHD-modules, the total exergy demand is not, however, 200 Ws/g but less, for it is only necessary to overcome the friction to pass the air through the low temperature heat exchanger of the MHD-module. This exergy will be supplied during condensation of H$_2$O taking place at an altitude between 3 and 4 km; the specific heat of condensation is, if 1% of total wet air flow condensates about 35 Ws/g. The specific exergy should be sufficient for transportation; the anergy raises the temperature of the ascending air. By way of an example: If the temperature of ambient air T = 220 K at 20 km height, and if the temperature of air within the pipe is decreased from its entrance temperature T$_U$ = 300 K at ground not 200 K but to 170 K due to H$_2$O - condensation, then the air leaving the pipe appears to be supercooled by 220 − 130 = 90 K. Theoretically, the cooling air for the exergy transformer can increase its enthalpy by about 90 Ws/g absorbing the waste heat of the process until reaching thermal equilibrium with the ambient air.

The air flow necessary to cool a single mirror plus MHD system unit under the conditions mentioned is:

$$\dot{m}_{air\ per\ unit} = \frac{26.5}{90} \frac{MWs}{Ws} = 3 \cdot 10^5 \text{ g/s}$$

The tube or pipe for the cooling air should have a cross section of less than 100 m$^2$, i.e. a diameter of less than 12 m, if the air enters the pipe at ground with a velocity of 3 m/s and a density of 10$^{-3}$ g/cm$^3$.

The massflow rate of condensed water is as assumed:

$$\dot{m}_{H_2O\ per\ unit} = 10^{-2} \cdot \dot{m}_{air\ per\ unit} = 3 \cdot 10^3 \text{ g/s}$$

DESCRIPTION OF THE DRAWINGS

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawings in which:

Figure 1:
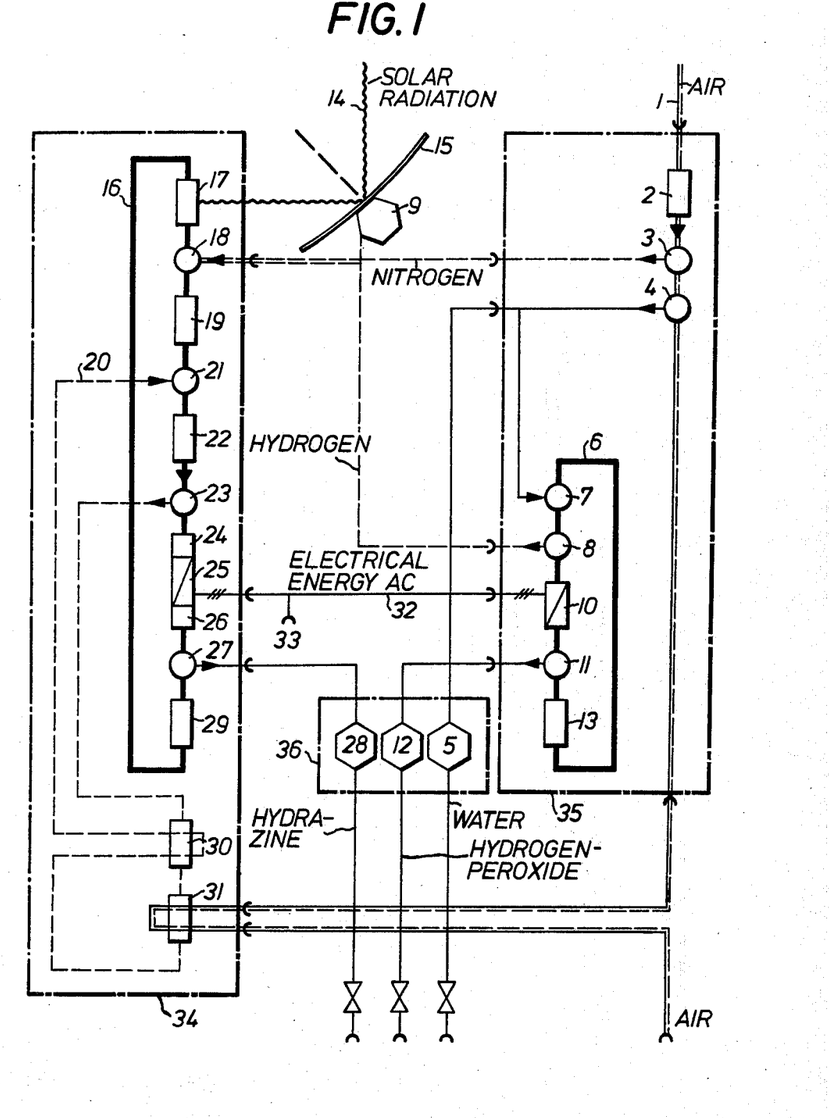
FIG. 1 is a system diagram and flow chart for hydrazine synthesis in accordance with the method of my copending application.

The basic system which is the subject of the above-identified copending application is depicted in FIG. 1. Concerning that application, however, the system does not require a particular spatial distribution of its subsystems and components. Presently, a particular distribution is envisioned without modifying the system as such. Major subsystems are, a (or many) hydrazine and electricity generator 34 cooperating with a mirror 15 for collecting solar energy and disposed aloft. Subsystem 35 is raw material generator and placed on ground. The same is true for a storage system 36.

Air 1 is sucked into the ground system (portion 34) by means of a suction device 2, and nitrogen is separated from the air at 3, while moisture is caused to precipitate at 4 to be stored in a tank 5 on the ground and in the stem as will be explained shortly. Actually precipitation 4 occurs at some distance from ground up in the stem. The (dry) air continues up for use as coolant in the subsystem 34 aloft, but the nitrogen separation is also carried out aloft!

The water is injected at 7 into a watery solution of KOH of ground system 35 circulating along a path 6. Hydrogen is extracted from that circulation at 8 and fed up in the stem and stored, in parts, in the mirror support 9. A MHD converter 10 synthetizes hydrogen peroxide by electrolytic process. The $(OH)_2$ as produced is taken out of the circulation at 11 for storage (temporary) 12. The device 13 is an mfd - fluid prime mover to sustain the circulation 8 of the watery KOH solution.

Solar radiation 14 is focused by a concave reflector 15 on top of the stem onto a radiation absorption heater 17 of subsystem 34 (aloft) which heats a liquid consisting, basically and at first of Lithium and finely divided iron. Nitrogen and hydrogen respectively from 3 and 8 are added to Li at 18 to obtain $LiNH_2$ (as solution in the Li) as per function box 19.

Pressurized $N_2$ is added to the $Li-LiNH_2$ fluid (liquid) and as a tdf working gas. The pressurized $N_2$ expands under acceleration of the liquid phase and is separated therefrom at 23. The liquid phase is focused into a jet at 24 and subjected to MHD processing (25), whereby hydrazine is produced by electrolysis of the $LiNH_2$. Additionally, excess electrical energy is extracted from MHD converter 25 and fed by cable 32 down through the stem to ground.

A jet spoiler 26 slows or stops the jet in an emergency, but is not needed for normal operation. Hydrazine is separated (condensed) from the liquid phase at 27 to flow through the stem and into a storage 28 in the base of the stem on ground. A jet capture device 29 of subsystem 34 converts the residual kinetic energy of the liquid phase into pressure to obtain return flow of the liquid (Li with residual $Li NH_2$) along path 16 to the point of heating (17) so as to complete the circulation of that working liquid.

The gaseous phase following extraction at 23 enters in recuperative heat exchange with itself at 30 to lose temporarily as much thermal energy as possible for low temperature, isothermal recompression at 31. Following recompression, the cold $N_2$ receives heat at 30 and returns to point 21.

The isothermal re-compression at 31 may involve circulation of another, cooling medium, but is ultimately controlled as far as temperature is concerned by ambient air ascending through the stem and possibly removed by mover 1.

After having described the overall system, I proceed first to describe the structure of the mirror 15; later I will describe the reed-like tower and stem supporting the system at elevated altitudes.

Figure 2:
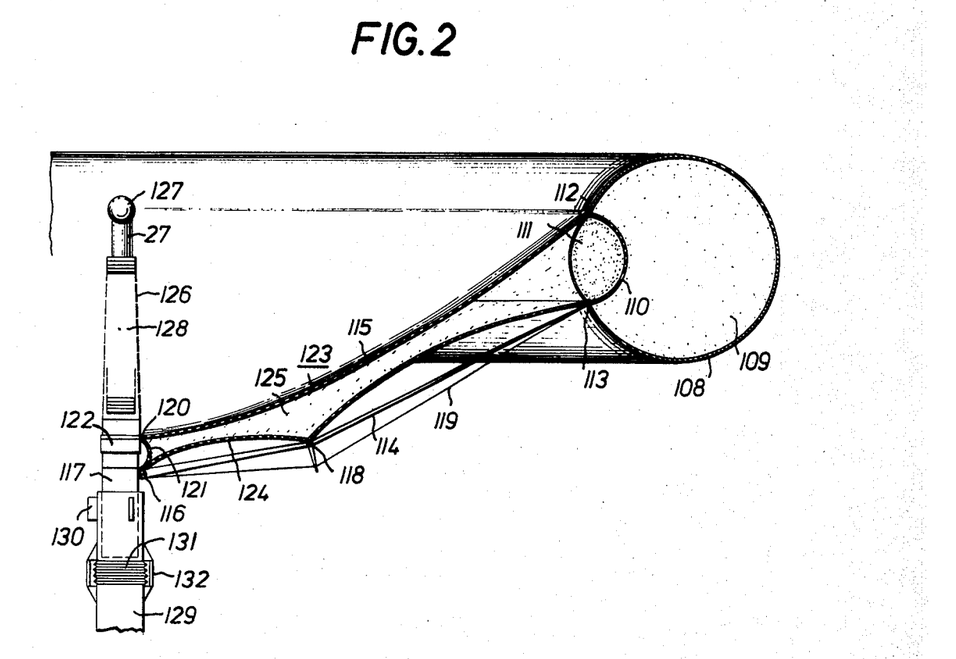
FIG. 2 is a cross-section through a hollow, concave mirror stabilized by means of internal pressure differential.

FIG. 2 is a radial sectional view of mirror 15 including particularly a support backing and buoyancy suspension for a reflecting foil 115. The construction includes a very large (toroidal) cushion 108 filled with $H_2$, 109 to generate the total buoyancy of the mirror. The cushion 108 is reinforced and stiffened from the inside by a compartment 110 filled with $H_2$ of higher pressure 111. The connecting welding seams 112 and 113 between cushion 108 and compartment 110 offer on the one hand anchoring points for supporting arms 114, and are on the other hand anchoring lines for the reflecting foil 115. The supporting arms 114 are connected to a central pipe 117 by joints 116. The arms each have a second joint 118 in between located nearly symmetric to both ends. The supporting arms 114 center the cushion 118 and are prestressed by cables 119 for this purpose.

The mirror (or reflecting) foil 115 is connected to another foil by means of a second welding seam 120 to serve as an anchoring line. Foil 121 is secured to a ring 122 right at that seam 120. This ring is pushed over the central pipe 117 without being fixed and it can be displaced and held by a drive mechanism (not shown here) in order to perform proper adjustment of mirror.

In order to produce the parabolic form desired of mirror foil 115, an additional mirror cushion 123 is provided which includes the mirror foil 115, the transverse foil 121 and a bottom foil 124. The bottom foil 124 is connected with the (toroidal) cushion 108 at the lower welding seam 113. The mirror cushion is filled with air at a pressure lower than that of ambient air. The mirror cushion must, therefore, be fixed on both the joints 116 and 118 of the supporting arm 114 in order to stretch the mirror foil as desired.

The central pipe of the mirror holds on its upper end one or more MHD-modules 27 by means of a supporting frame 126 (not shown in detail here); the radiation absorption heat exchanger of MHD-module is located at the focus 127 of mirror. The exit (waste) heat exchanger of MHD-module is located at the air outflow 128 of central pipe 117. The central pipe is, on its lower end, placed into another pipe 129 to provide the connection to the supply channels 139 (not shown here) in stem 141. This connection or socket can be released in order to permit replacement of the mirror by another new mirror, initially having being folded up. The connection is locked by means of bolts 130. The connecting pipe is interrupted and made flexible by a bellow 131 to permit adjustment of the mirror axis in regard to the sun. Screws 132 stretch the bellow nonuniform by a drive mechanism (not shown here), thereby bending the connecting pipe 129 at the bellows.

The mirror will be transported in folded up configuration by passing it up through the supply channel and the connecting pipe in the reed tower. After the central pipe 117 is fixed by the bolts 130, the (toroidal) cushion 108 will be inflated by filling with $H_2$; the final concave form of the mirror cushion 123 will be attained after the supporting arms 114 have reached their final position by stretching the cables 119. The final adjustment of mirror form is obtained by changing the axial position of ring 122.

Figure 3:
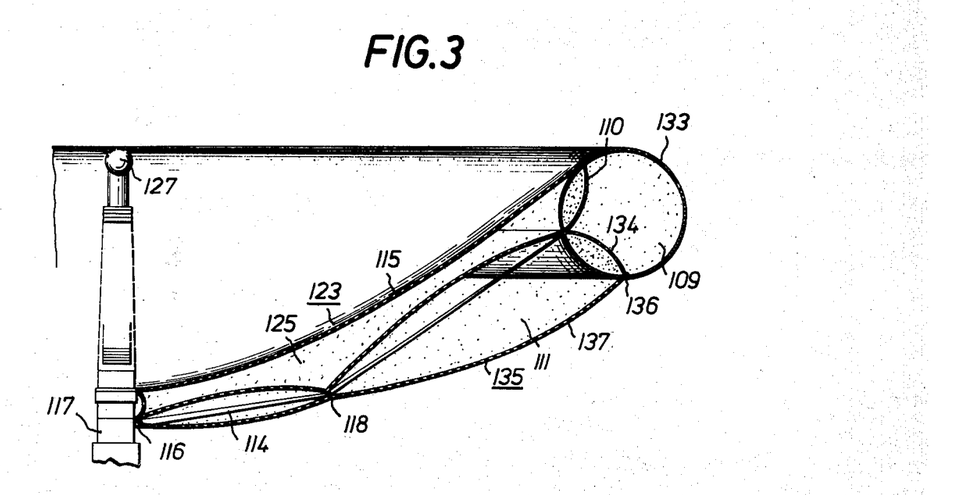
FIG. 3 is a cross-section through a modified mirror.

FIG. 3 is an alternative and, actually, the preferred example for a reflector and mirror; all the details common to both designs are omitted. The difference of this design as compared with the one shown in FIG. 2 is given by the smaller (toroidal) cushion 133 and by the additional cushion 135 of stretching the arms 114 instead of cables 119. The advantage is to be seen in the omission of cables as they are mechanically movable parts; the mirror cushion reaches its final position by inflating the stretching cushion 111 with $H_2$. The buoyancy of this cushion permits to reduce the (toroidal) cushion 108 in size.

The stretching cushion is formed on its top by the bottom foil 124 of mirror cushion 123, on its bottom by the stretch foil 137. Stretch foil 137 and (toroidal) cushion 133 are connected along a welding seam 136. This welding seam is stabilized from the inside by an additional compartment 134. The stretch cushion is closed in regard to the central pipe by connecting it with the bottom foil 124 (and with the transverse foil 121). Also, in this example, both the mirror cushion as well as the stretching cushion have to be fixed at the joint 118 of supporting arms 114. These supporting arms are protected now by the $H_2$ of the stretching cushion to serve as a protective gas.

Due to the fact that a single MHD-module generates about 11 MW, many mirrors have to be fixed in parallel on a common stem. Thus the solar exergy transformer has a construction similar to that of (higher) plants; the supply channels of a subgroup of mirrors are bundled to form branches, and all the branches together form the stem. This construction assures each mirror to have its own supply channel, or - in other words - to be supplied with cooling air independent from the others. Each mirror can be replaced in total, again independent from the other mirrors, by using the supply channel for transportation. The individual MHD-modules of a mirror can also be replaced. The total of all the channels with their individual walls and with the space between them offers the possibility to design very resistant stems.

Figures 4, 5, 6, 10, 11, 12:
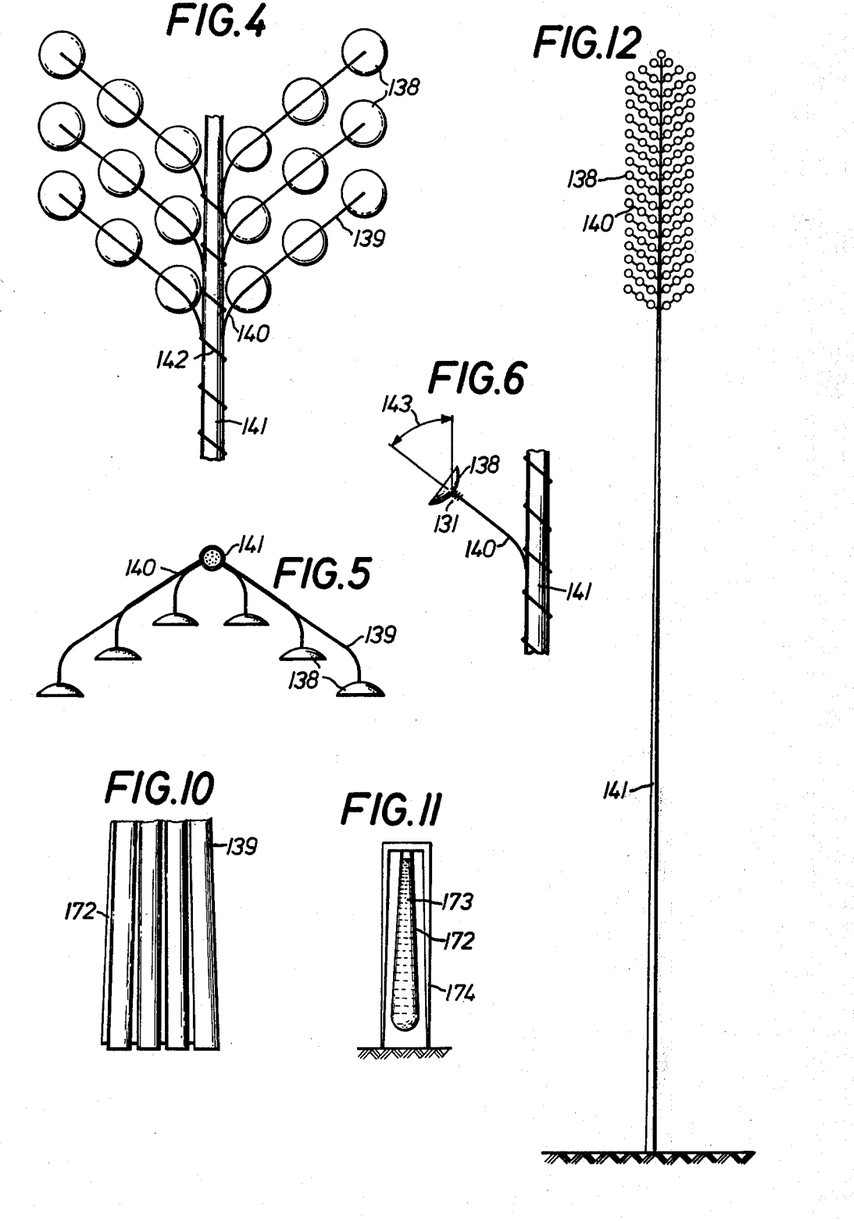
FIG. 4 shows schematically an arrangement of many mirrors on a common support and reed-like tower.
FIG. 5 is a section view through FIG. 4.
FIG. 6 is a schematic illustration of the elastic connection of mirror and reed to obtain the necessary orientation of the mirror to the sum.
FIG. 10 illustrates the principle of anchoring the reed through widening of channels.
FIG. 11 shows the effect widened channels have on the reed.
FIG. 12 is a view drawn approximately to scale for a complete system as can be used in more northerly latitudes.

FIGS. 4 and 5 show in side and horizontal section views respectively, the construction of the branches as well as of the arrangement of some branches to form a section of the stem 141. Every three mirrors 138 in combination with three supply channels 139 form a branch 140, whereby each channel 139 terminates in a pipe or tube 129 (FIG. 3). The branches 140 are arranged in vertical levels, and together they form the stem. An additional duct 142 is wound around the bundle of channels 139 when still in parallel, upright disposition and not yet bent to form any branches. This spiral channel or duct 142 surrounding the bundle of supply channels is provided to hold together the bundle and, at the other hand, provides access to the branches and to the top of stem; this duct 142 is also called the access channel.

FIG. 6 shows the inclination of branches in regard to the stem designed for use at a latitude between 50 and 60 degree north; the angle 143 is equivalent to the latitude of the location of the stem. For the adjustment of mirrors in regard to the instantaneous position of the sun and for the compensation of the (low frequency) oscillations of the stem the bellows 131 are used and distorted by the drive mechanism (not shown here) operating the spindles 132.

Figures 7, 8:
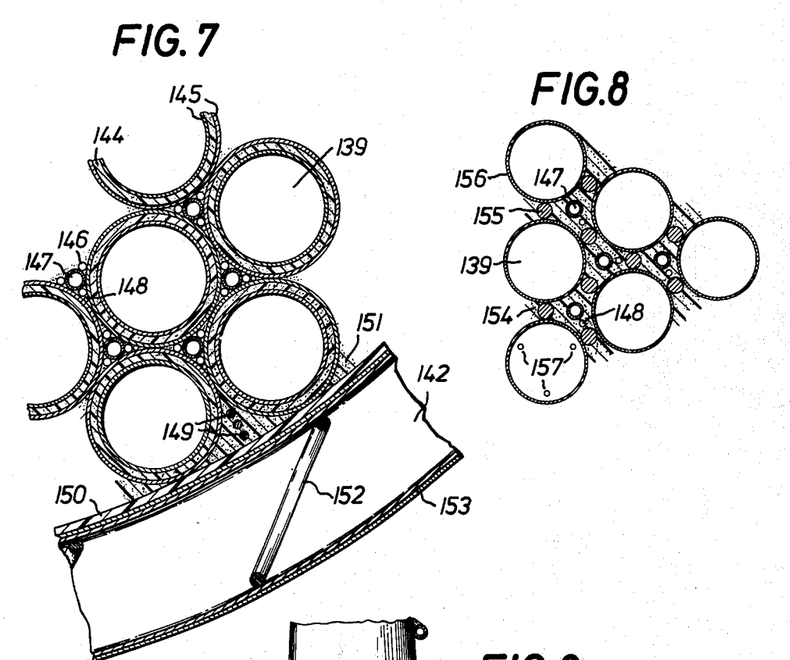
FIG. 7 is a portion of a cross-section through a reed.
FIG. 8 is a modified cross-section through a reed.

FIG. 7 is a horizontal sectional view of the stem 141, and of the outer part to show the jacket and also the access channel 142. The individual supply channels 139 are constructed from pipes 144, made from rigid foam inside with blanket foils 145 on the outside. The cooling air flows upwards within the pipe 144. To make these pipes resistant in regard to bending, highly elastic spirales 146 are used which are fabricated from resins, reinforced by glass fibers and wound around the low cross-section $H_2$-channel 147. These spirals are placed in the voids between the pipe 144. Respective three of these spirals surround each $H_2$-channel and have at the same time the (additional) function of a hollow electrical conductor in that Al- or Cu-foils are inserted and serve for the transport of electrical energy from the modules aloft to ground. Each pipe 144 is associated and combined with a unit consisting of one $H_2$-channel 147 and three spirals 146. The hydrazin pipe 148 surrounds in addition the $H_2$-channel helically.

The voids and spaces in the bundle of all supply channels 139 and surrounding ducts 147, 148 and spirals 146 are filled with hardened rigid foam 151 and provides thermal insulation as well as for cushioning of all embedded tubing; the foil 150 is the blanket jacket or envelope of the stem. The thermal insulation 151 is used also to embed additional lines 149 for control and other uses.

The access channel 142 has the same diameter as the pipes 144; it is made, however, not by using rigid foam but from multi-layer foils 153 for reinforcement, and it is stretched by means of an inserted helix 152. These spirals are produced from glass fiber reinforced resins. This access channel is equipped with two or more transportation systems (not shown here), which are operated by electrical energy and guided on rails. Energy recovered from the descending transport unit will supply the ascending unit; energy is consumed, therefore, only to overcome friction losses. The transportation systems are equipped in the same way modern air-planes are to maintain constant pressure inside (when flying at high altitudes).

FIG. 8 presents another example of the stem in a completely integrated design. The supply channel 139 for the cooling air are not pipes made from hardened, i.e. rigid foam but are embedded directly in a body 154 made of rigid foam and isolated from it (water-tight) by a foil 156. This foil 156 is stretched by a spiral 155 being fixed at this foil and made from fiber glass reinforced resins (in the same way as described for the access channel 142). By this construction the stem is elastic, and, on the other hand, it can be produced by foaming. The $H_2$-channel 147 is also embedded within the body 154. The electrical energy will be transported in this case by hollow cables 157 being freely within the suspended supply channel 139.

The design of the exergy transformer stem approximates the principle, by which in nature large reeds or grasses are constructed. In nature a stem is composed from numerous small and large channels made from extremely thin diaphragmas and embedded in foam-like materials. Tough fibers enclosed in combination with the blanket of the stem provide elasticity. Some of the internal channels are utilized for transportation of water and nutrients as well as of the substances produced by photosynthesis to be stored at roots. The equidistant "knots" of the stem provide amongst other tasks the (radial) contraction of stem. (The function of knots is taken over in case of the exergy transformer - quasi continuously - by the access channel 142 wound around stem 141).

Grasses (as an example: cortaderia selloana) can reach a height of about 1.8 m by this principle up to the beginning of flowers; the corresponding diameter of the stem at ground is 17 mm. The flower itself has a length of about 0.4 m and a diameter of 150 mm in average. Therefore, the ratio of total length to maximal diameter of the stem is about 130. In the case of the exergy transformer the scale must be about $10^4$; the technical realization of such a stem seems to be possible only when using plastics. Foils made from poly-amides have a tear rupture length up to 50 km, while hardened foams made from poly-urethans may reach a height before collapsing up to 10 km. The properties of these materials mentioned, in combination with an optimal design and considering the fact that the stem transmits its weight partially to ground but is lifted to a considerable extent by the buoyant mirrors, should enable construction of the stems desired.

A brief estimate shall demonstrate the design problem of the auxiliary systems, especially that of internal transportation systems. The ultimate goal of the exergy transformer is the storage of exergy. During operation, large massflows of different substances, but also electric power are to be transported within the stem; as a consequence, the basis of stem will play a central role (similar as the root system of plant does) for distribution of substances, for storage of substances and, at last, by chemical processing.

To synthesize 858 moles of $(OH)_2$ and one mole $(NH_2)_2$ per second from four moles $H_2O$ and one mole $N_2$ within the exergy transformer, an electric power of 8658 kW is needed (without considering internal consumption); the intermediate product are two moles $H_2$. The formation of hydrogen-peroxide (and $H_2$) needs 670 kW, the last step of formation of hydrazine the (residual) 188 kW. The problem of internal transportation for one exergy transformer unit with a net power of 11 MW is expressed by the mass flow rates of the following substances (the unit power related to the production of one mole $(NH_2)_2$ per second is 1/12.8 of 11 MW):

| | | |
|---|---|---|
| 1. Coolant air | | = 300 kg/s |
| 2. Products of exergy transformer | | |
| $H_2O$ | (condensated) | = 3.00 kg/s |
| $(OH)_2$ | 12.8 . 68 g/s | = 0.87 kg/s |
| $(NH_2)$ | 12.8 . 32 g/s | = 0.41 kg/s |
| 3. Raw materials for the synthesis | | |
| $H_2O$ | 12.8 . 72 g/s | = 0.92 kg/s |
| $N_2$ | 12.8 . 28 g/2 | = 0.36 kg/s |
| 4. Intermediate products of synthesis | | |
| $H_2$ | 12.8 . 4 g/s | = 0.05 kg/s |
| 5. Electric power for synthesis | | |
| $(OH)_2$ | 12.8 . 670 kW | = 8.58 MW |
| $(NH_2)_2$ | 12.8 . 188 kW | = 2.42 MW |

One of the problems posed by auxiliary systems is to be seen in the storage and distribution of products. An exergy transformer with 100 units has an output of end products per 8 hours' operation of about:

| | | |
|---|---|---|
| 5,750 | t | $H_2O$ |
| 2,500 | t | $(OH)_2$ |
| 1,175 | t | $(NH_2)_2$ |

These facts result in the following internal organisation of the exergy transformer:

1a: The three products $H_2O$, $(OH)_2$ and $(NH_2)_2$, which are liquids at 300 K, will be stored within the basis of stem; $H_2O$, which is an exergy-free product, is used to help anchoring the stem at its basis.

1b: $H_2$, which is a gaseous intermediate product, will be stored within the different cushions of mirrors and used to generate the buoyant force of mirrors.

2a: $H_2O$ is extracted from the cooling air within the first one-third of the stem.

2b: $N_2$ is extracted from the cooling air before air enters the MH-module at the lowest possible temperature.

3a: All the processes based on $H_2O$ to be the raw material take place within the basis of the stem.

3b: All the processes based on $N_2$ and $H_2$ to be the raw materials take place within the MHD-modules at the top of the stem.

Figure 9:
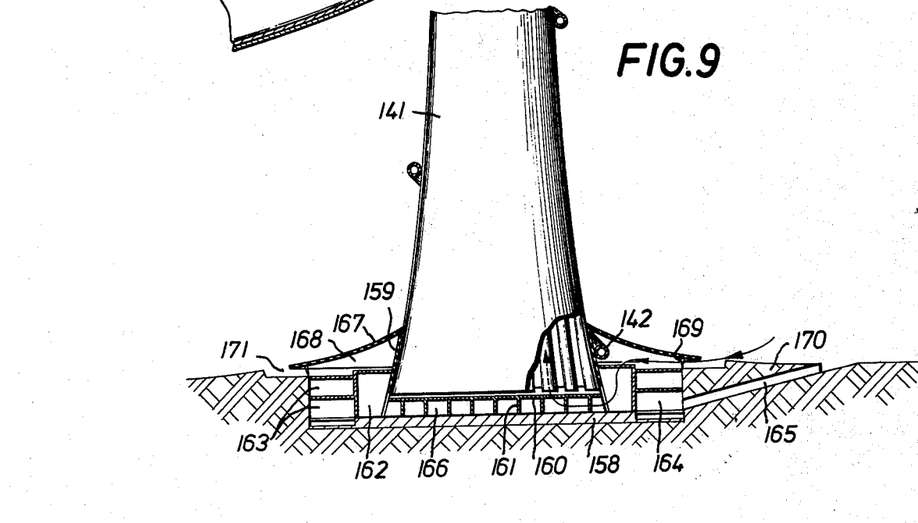
FIG. 9 is a longitudinal section view for anchoring the reed to ground including space for auxiliary equipment and air intake.

FIG. 9 is a radial sectional view of the basis of stem and the lower part of stem, designed for a site on land. A bottom plate 158 is located below ground; a conical support 159 is fixed on the bottom plate; so is a attice structure or grid 160 supported by props 161 from bottom plate 158. The lower end of stem 141 is widened conically and occupies the space inside the ring 159; the stem bears upon the grid or lattice structure 160. The bottom plate has to compensate all the forces acting on the stem which the stem itself cannot compensate by its internal forces; the grid 160 transmits the forces in vertical direction to ground while the ring 159 transmits vertical forces in opposite direction as well as horizontal forces.

On the bottom plate are, in addition, placed the concentric ducts 162 for the cooling air, rooms 163 for assembling mirrors, and MHD-modules, for the subsystems 25 used for synthesis of $(OH)_2$ and storage facilities 164 for the storage of both $(OH)_2$ and $(NH_2)_2$. All these installations belong to the basement. An entrance 165 (also for railway) permits direct access to all rooms of basement, especially to the central room 166 below the grid 160, in which all the different hydrazine-pipes come together and in which the high voltage lines from the different mirrors are interconnected together. During the construction of the stem this central room 166 is occupied by the machinery producing foils, foams and glass fibers for stem 141.

Beyond the rooms within the basis of the an additional room 168 is formed by the elastic roof 167 made from stretched foils; this room is used mainly as an air duct and to shelter the concentric ducts 162 from rain and snow. The roof 167 is fixed at ring 159 and stretched in radial direction by props 169. A wall 170 has been made by piling the excavated soil around the foundation to protect the entrance 171 for the air, which will be the coolant and raw material for the exergy transformer. In the upper room 168 the power distribution, voltage transformer, offices and other auxiliary equipments are located; especially the exit of access channel 142 for the transportation systems is here.

A base for an off-shore stem can be constructed following the same principles. The base is formed from concrete at the coast (in the same way large oil-tanks of similar dimensions are made) and will be transported (floated) to the installation site and then anchored to ground.

FIG. 10 is a detail concerning the widening of the lower end of the stem 141 in order to anchor the stem at its base. The stem is wedged by the water to be stored, simply by depositing the water in between the supply channels for air at the lower end of stem. The $H_2$-channels 147 are replaced at the lower 100 – 200 m of the stem by pressure hoses; the pressure hoses are surrounded by an elastic tube 172 made from plastic foils. The water flows into the space thus formed. The elastic tube 172 is of conical configuration, and its diameter increases at the lower end. The lower end of tube 172 weighing upon the lattice or grid 160 is closed. The geodesic pressure of water stretches the tube accordingly; the large number of the water storage tubes produces a wedging effect. If the stem is made from a foam body as shown in FIG. 8, the water storage tubes are inserted into the foam body which is modified accordingly. The water stored within the tubes is an additional weight to urge the stem onto the grid, and wedges, on the other hand, the stem into its basis. Because the stem is surrounded by a thermic isolation blanket, this (water) storage can be used also in winter times; the position beyond ground provides for outflow of water at a high static pressure.

The gaseous H₂O, condensed within the stem at an altitude between 1 and 4 km, flows down as a liquid on the inner surface of supply channels; the liquid water is absorbed by a wick-like structure (not shown here) and passed into tubes ending in the water storage tubes mentioned.

FIG. 11 shows an experimental structure for demonstrating the wedge effect of a liquid. The liquid 173 is enclosed within the conical storage tube 172 fixed at the supporting frame 174. The static pressure of the liquid stretches the tube; the stiffness of this wedge decreases naturally with height.

One of the systems operated at the base of stem is the one synthetizing $(OH)_2$. This synthesis is made in the same way as that of $(NH_2)_2$ in the MH-modules proper. Instead of $LiNH_2$, $H_2O$ is used, mixed with finely dispersed iron to be the bipolar electrodes. This fluid enriched with substances to increase its electrical conductivity will be forced to pass through a travelling magnetic field in form of a jet; the travelling magnetic field is generated by a coil system excited by currents from the MHD-modules with the same frequency. The (generalized) force of this electromagnetic interaction is also an electrical field, which is generated by the slip $s > o$ between both the velocities of phase and fluid to originate toroidal currents. The $R_m$-number is low due to the low electrical conductivity of $H_2O$, the interaction is rather weak (but no energy shall be extracted). The gaseous $H_2$ formed is sucked analogous to the $(NH_2)_2$-separation in the MHD-module; the $(OH)_2$ can be extracted in the same way and separated from the $H_2$ by condensation.

The electrical energy transferred from the MHD-module will be used without any conversion either of voltage or frequency; the conventional way of electrolysis would require first the transformation (of electrical energy) to very low voltages, and then the rectification of the high frequency currents. The $(OH)_2$-formation takes place, therefore, in systems produced also in form of modules, which are constructed almost identical to the MHD-modules proper; this (auxiliary) system does not absorb external heat nor does it provide a large viscous interaction for the acceleration of the electrolyte. The description of MHD-modules meets well the technical design of the (auxiliary) stem; basically the devices for isothermal compression of the tfd-working fluid are inapplicable.

FIG. 12 is a total view of the solar exergy transformer having 103 mirrors as described, and drawn to scale the top of stem is about 22 km above ground; the diameter of stem at ground is 170 m. If three of the mirrors are used for internal supply, then the production of this exergy transformer is characterized by the numbers mentioned above.

The invention is not limited to the embodiments described above, but all changes and modifications thereof not constituting departures from the spirit and scope of the invention are intended to be included.

I claim:

1. In a solar energy conversion system having a plurality of solar energy absorbing and conversion units, each provided with a reflector to focus solar energy to an absorbing portion of the conversion unit, a support structure, comprising:

a plurality of tubes leading upright from the ground to the conversion units of the plurality, the tubes having means to form the tubes into a need-like bundle; means for anchoring the bundle tubes to the ground; means to resiliently fasten and suspend the reflectors and conversion units to the top of the reed-like bundle;

means included in the bundle for transporting energy from the conversion units to the ground; and means at the top of the bundle to obtain buoyancy support of the reflectors and the conversion units as fastened to the top of the bundle.

2. A system as in claim 1, the reed-like bundle being jacketed in a thermally insulated envelope.

3. A system as in claim 1, there being space between the tubes in the bundle, the space being filled with foam.

4. A system as in claim 1, there being additional ducts made of foam included in the bundle to transport fluids to and/or from the converters.

5. A system as in claim 1, there being a spiral tube wound around the bundle.

6. A system as in claim 1, including means for causing air to flow up in particular areas of the tubes.

7. A system as in claim 6, including means in said particular tubes for trapping condensated water and feeding it to the conversion units.

8. A system as in claim 7, wherein said particular tubes are conically enlarged near the ground.

9. A system as in claim 1, wherein said means for anchoring said bundle includes a grid-like structure and is laterally enclosed by a conical sleeve.

10. A system as in claim 9, said grid and said sleeve being secured to a large anchored foundation in the ground, being at least partially submerged.

11. A system as in claim 10, including an air intake between said grid and said foundation.

12. A system as in claim 1, said means for transporting energy including ducts serving as conduits for a chemical energy carrier produced by the conversion units.

* * * * *